United States Patent
Hudson

[15] 3,642,310
[45] Feb. 15, 1972

[54] CORNER JOINT ASSEMBLY
[72] Inventor: Robert Hudson, Schnecksville, Pa.
[73] Assignee: Keystone Lamp Manufacturing Corp., Slatington, Pa.
[22] Filed: May 4, 1970
[21] Appl. No.: 33,995

[52] U.S. Cl..................287/54 A, 287/189.36 H, 52/220, 52/656, 312/257 R, 160/381
[51] Int. Cl............................................F16b 7/18
[58] Field of Search..........287/54 A, 54 C, 20.92 R, 20.92 C, 287/189.36 H; 312/257 R, 257 SK; 52/656, 220, 221; 160/381

[56] References Cited
UNITED STATES PATENTS

| | | |
|---|---|---|
| 3,485,519 | 12/1969 | Chiu..........................287/189.36 H X |
| 2,291,726 | 8/1942 | Kaufmann..................287/189.36 H X |
| 3,498,654 | 3/1970 | Diaz et al.........................287/54 A X |

*Primary Examiner*—Thomas F. Callaghan
*Assistant Examiner*—Wayne L. Shedd
*Attorney*—Seidel, Gonda & Goldhammer

[57] ABSTRACT

A corner joint assembly is disclosed wherein tubular members are joined together at a miter joint with holes provided for electrical conductors which may extend in a horizontal and vertical direction through the tubular members.

4 Claims, 7 Drawing Figures

PATENTED FEB 15 1972
3,642,310
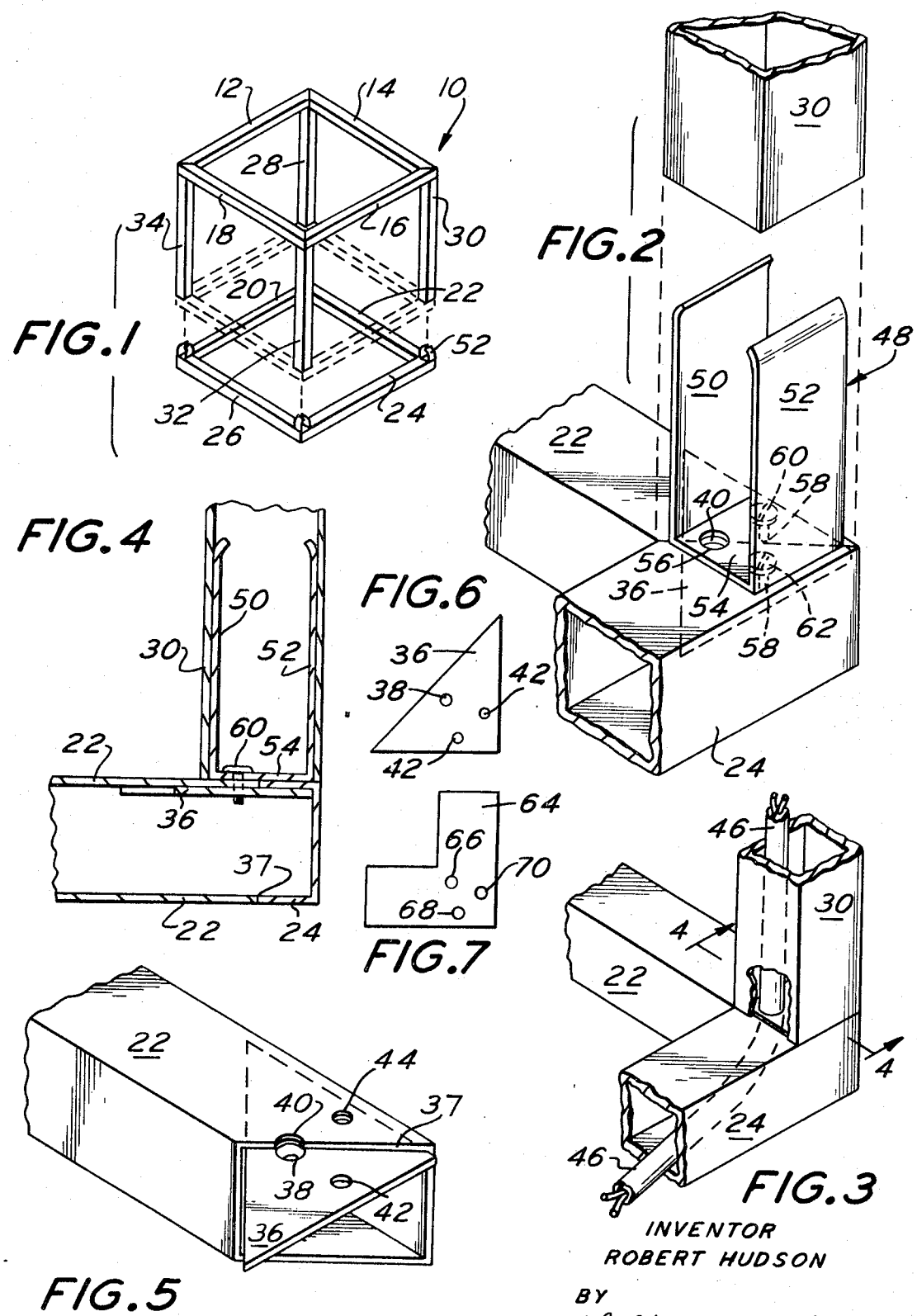
INVENTOR
ROBERT HUDSON
BY
Seidel, Gonda, Goldhammer
ATTORNEYS

CORNER JOINT ASSEMBLY

This invention relates to a corner joint assembly having high strength while permitting the passage of electrical conductors in horizontal and vertical directions through hollow tubular members. Two or three hollow tubular members are connected together at a miter joint by mechanical fasteners. The tubular members are either too thin to be welded at the joint so that conductors may pass therethrough or the tubular members are coated with an exterior coating which would be destroyed if the tubular members were welded or soldered at the joint. At the same time, a joint is provided which is rigid and separable for installing the electrical conductors or maintaining the same.

In accordance with the present invention, two tubular members are in abutting relationship with a miter joint. Along the miter face, each of the tubular members has a mating semicircular notch defining a wireway hole. In addition, each tubular member has a hole spaced from the miter face by the same distance. A brace member is provided inside the tubular members and is provided with a wireway hole and a pair of connection holes. A connector member overlies the miter joint and likewise is provided with a wireway hole and a pair of connector holes. The connector member is adapted to interconnect the first two tubular members with a tubular member generally angularly disposed with respect thereto.

It is an object of the present invention to provide a novel corner joint assembly which is simple, inexpensive, rigid, and does not require welding or soldering.

It is another object of the present invention to provide a novel corner joint assembly which facilitates installation and maintenance of electrical conductors extending through the tubular members at the joint assembly.

It is another object of the present invention to provide a corner joint assembly which assures good intimate contact between tubular members at a miter joint.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a perspective exploded view of a frame utilizing the corner joint assembly of the present invention.

FIG. 2 is an enlarged exploded view showing one corner of the frame shown in FIG. 1.

FIG. 3 is a partial perspective view showing the corner in FIG. 2 in an assembled relationship.

FIG. 4 is a sectional view taken along the line 4—4 in FIG. 3.

FIG. 5 is a partial perspective view of one tubular member and the brace member therewithin.

FIG. 6 is a plan view on a smaller scale of the brace member utilized in FIGS. 1-5.

FIG. 7 is a plan view of an alternate brace member.

Referring to the drawing in detail, wherein like numerals indicate like elements, there is shown in FIG. 1 an exploded perspective view of a frame designated generally as 10. The frame 10 may be utilized as part of furniture, a lamp or lighting fixture, the frame for an electrically operated device wherein it is desired to obscure the electrical conductors within the frame, etc.

The frame 10 includes tubular members 12, 14, 16 and 18 interconnected into a rectangular configuration with mitered joints between the adjacent ends of the members. A second rectangular configuration is provided by corresponding tubular members 20, 22, 24 and 26 interconnected in the same manner. The two rectangular configurations are interconnected with one another by tubular members 28, 30, 32 and 34. All interconnections are releasable.

A typical interconnection between three of the tubular members is deemed sufficient for purposes of the present disclosure. Referring to FIGS. 2-4, there is illustrated the interconnected relationship between tubular members 22, 24 and 30. A triangular brace member 36 is disposed within members 22 and 24 at the joint. Each of members 22 and 24 is provided with an end face 37 cut on a bias so as to form a mitered joint. The end face 37 is disposed at an angle with respect to the side faces of the members 22 and 24 at an angle of 44.5° to 45°. Hence, the included angle between members 22 and 24 is between 89° and 90°.

At the mitered face 37, each of the members 22 and 24 is provided with a semicircular notch 40. Brace member 36 is provided with a hole 38 which will be aligned with the notches 40 thereby defining a wireway hole. Brace member 36 is also provided with a pair of connection holes 42. Each hole 42 is on opposite sides of and equidistant from the mitered joint. Each of the members 22 and 24 is provided with a hole 44. Each hole 44 partially overlies one of the holes 42. The distance between the holes 44 is slightly greater than the distance between the holes 42 by a distance of about 0.002 or 0.003 inch.

A connector member 48 is provided for interconnecting the tubular members 22 and 24 with tubular member 30. The connector member 48 includes upstanding legs 50 and 52 integral with a base 54. Base 54 overlies the mitered joint between members 22 and 24. Base 54 includes a hole 56 aligned with the mating notches 40 and aligned with the hole 38 in brace member 36 so that electrical conductor 46 may extend therethrough. Base 54 also includes a pair of connector holes 58 each aligned with one of the holes 42 in the brace member 36. A self-tapping screw 58 or 60 extends through the holes 58, through the holes 44, and through the holes 42. Due to the fact that the distance between holes 44 on the members 22 and 24 is slightly greater than the distance between holes 58 or holes 42, there results in the self-tapping screws 58 and 60 having a compressive effect on the members 22 and 24 so as to assure that the mitered faces on the members 22 and 24 are held in intimate contact at the mitered joint.

Each of the legs 50 and 52 is curved inwardly only at their upper ends so as to facilitate entry into the tubular member 30. In the illustrated embodiment, the legs 50 and 52 are perpendicular to the top surface of members 22 and 24 whereby the rectangular configurations of frame 10 are disposed one above the other. It is within the scope of the present invention to orientate the legs 50 and 52 at any acute angle so as to position the rectangular configurations in an overlapping but displaced relationship. That is, the tubular members 28–34 will be at an acute angle with respect to the rectangular configurations rather than being perpendicular thereto.

In FIG. 7, there is illustrated an L-shaped brace member 64 which may be substituted for brace member 36. Brace member 64 is provided with a wireway hole 66 and spaced holes 68 and 70 which are identical to holes 38 and 42.

The aligned holes 38 and 56 which are concentric with the semicircular notches 40 results in the provision of a wireway hole whereby electrical conductor 46 may pass from tubular member 30 to either one or both of the tubular members 22 and 24 and vice versa. The interconnection between tubular member 30 and the members 22 and 24 provided by connector member 48 enables the assembly to be disassembled. In order to telescope over the legs 50 and 52, the tubular member 30 must compress the members 50 and 52 towards each other, and thereby provides a friction fit. Member 48 is made from a resilient material such as spring steel. In a typical connector member 48, each of the legs 50 and 52 lie in a plane which is approximately 88° to 89° with respect to the plane of member 54 and are forced into a perpendicular orientation by the tubular member 30.

In a commercial embodiment of the present invention, the notches 40 are semicircular with a ¼-inch radius. The holes 56 and 38 have a ¼-inch diameter. The distance between holes 58 is the same as the distance between holes 42 and is approximately 0.002 inch smaller than the distance between holes 44. Each of the tubular members is rectangular 1-inch square extruded aluminum tubes. The tubular members may be plastic coated, painted, or anodized, etc. It will be appreciated that the dimensions and materials may be varied as desired.

It will thus be seen that the corner joint assembly described above attains the objects of the invention.

If desired, the base 54 of connector member 48 can be the only brace member if high strength and rigidity are not desired. In that event, members 36 or 64 would not be used. It should be apparent that the tubular members need not be orientated to form a rectangular configuration but that other configurations such as triangular can be made utilizing the concepts of the present invention.

The present invention may be embodied in other specific forms without departing from the spirit or essential attributes thereof and, accordingly, reference should be made to the appended claims, rather than to the foregoing specification as indicating the scope of the invention.

I claim:

1. A corner joint assembly comprising first and second tubular members interconnected at a mitered joint, each of said members having mating notches at the miter joint, said mating notches defining a wireway hole, a brace member juxtaposed to said joints, said brace member having a hole therethrough aligned with said wireway hole, said brace member having two connection holes, each connection hole in the brace member being on opposite sides of the miter joint so that the three holes in the brace member form a triangle, each of said tubular members having a connection hole spaced from the miter joint and at least partially overlying one of the connection holes in the brace member, a screw member extending through each connection hole for retaining the brace member and each tubular member in an assembled relationship, and said connection holes in said tubular members are spaced apart by a distance which is greater than the distance between the connection holes in said brace member.

2. A corner joint assembly in accordance with claim 1 wherein said brace member is disposed within said tubular members.

3. A corner joint assembly in accordance with claim 1 wherein said brace member is disposed within said tubular members, a connector member having a base juxtaposed to said mitered joint, said connector member having upstanding legs with respect to said base, said legs being telescoped within and frictionally coupled to a third tubular member disposed at an angle with respect to the plane of said first two tubular members, said base having a pair of connection holes with each hole being aligned with one of the connection holes in said brace member, and said screw members extending through the connection holes in said base and base member.

4. A corner joint assembly comprising first and second tubular members interconnected at a mitered joint, each of said members having a mating notch at said miter joint to thereby define a wireway hole, a brace member juxtaposed to said joint, said brace member including a base with upstanding, spaced, outwardly biased parallel legs, said base having a hole therethrough aligned with said wireway hole and two connection holes, each of said connection holes being on opposite sides of said miter joint so that said three holes in said base form a triangle, said first and second tubular members having connection holes spaced from the miter joint and each of said connection holes partially overlying one of the connection holes in said base, a screw member extending through each of said connection holes for retaining said base and said first and second tubular members in an assembled relationship, and a third tubular member disposed at an angle with respect to the plane of said first and second tubular members, said parallel legs being telescoped in and having a friction fit with said third tubular member.

* * * * *